United States Patent [19]

Doniwa

[11] Patent Number: 4,510,424

[45] Date of Patent: Apr. 9, 1985

[54] NUT RUNNER CONTROL CIRCUIT

[75] Inventor: Tabito Doniwa, Hachioji, Japan

[73] Assignee: Daiichi Dentsu Kabushiki Kaisha, Chofu, Japan

[21] Appl. No.: 530,212

[22] Filed: Sep. 8, 1983

[51] Int. Cl.[3] .......... G05D 17/00

[52] U.S. Cl. .......... 318/432; 318/434; 318/689

[58] Field of Search .......... 318/432, 433, 434, 689, 318/601; 81/469

[56] References Cited

U.S. PATENT DOCUMENTS

| | | | |
|---|---|---|---|
| 3,572,447 | 3/1971 | Pauley et al. | 318/432 X |
| 3,926,264 | 12/1975 | Bardwell et al. | 318/434 X |
| 4,056,762 | 11/1977 | Schädlich | 318/434 X |
| 4,210,852 | 7/1980 | Gustavson | 318/434 X |
| 4,322,668 | 3/1982 | Trussler et al. | 318/432 X |
| 4,463,293 | 7/1984 | Hornung et al. | 318/433 |

*Primary Examiner*—B. Dobeck

*Attorney, Agent, or Firm*—Robert E. Burns; Emmanuel J. Lobato; Bruce L. Adams

[57] ABSTRACT

A nut runner control circuit which permits tightening of a screw in the plastic region with a normal torque without necessity of detecting the critical point from the elastic region to the plastic region. The ratio $T_0/\theta_2$ of an increase $T_0$ of torque from a value $T_1$ to a value $T_2$ during tightening to a corresponding rotational angle $\theta_2$ (the rate of increase in the torque) and the torque $T_2$ are stored in a peak memory circuit. After rotation of an angle $\theta_1$ from the end point $P_0$ of the rotational angle $\theta_2$ the above-mentioned stored values are read out. The stored torque $T_2$ is increased at the stored rate $T_0/\theta_2$, so that at the intersection of the increased torque value to the actual tightening torque, the driving of the screw tightening tool is stopped.

3 Claims, 4 Drawing Figures

NUT RUNNER CONTROL CIRCUIT

BACKGROUND OF THE INVENTION

The present invention relates to control of a nut runner for tightening a screw, and more particularly to a nut runner control circuit for tightening a screw in a plastic region.

In recent mass production of industrial products there has come into what is called plastic region screw tightening according to which a screw is turned by a predetermined angle after the torque characteristic of a nut runner has shifted from an elastic region to a plastic region. However, since it is difficult to accurately detect a critical point from the elastic region to the plastic region, the screw tightening may sometimes take place with a torque smaller than a normal torque for desired plastic region tightening.

SUMMARY OF THE INVENTION

An object of the present invention is to provide a nut runner control circuit which permits tightening of a screw in the plastic region with a normal torque without the necessity of detecting the critical point from the elastic region to the plastic region.

To achieve the abovesaid object, the runner control circuit of the present invention for controlling a nut runner is provided with a torque detector of the nut runner for detecting a torque for tightening a screw, a rotational angle detector coupled to the shaft of the nut runner for producing an output indicative of the rotational angle of the nut runner, a memory operatively connected to the torque detector and the rotational angle detector for temporarily storing a rate of increase in the torque, $T_1/\theta_2$, in a second rotational angle $\theta_2$ during screw tightening in the elastic region at the end point $P_0$ of the second rotational angle $\theta_2$ and for storing the output value of the torque detector at the end point $P_0$, adding means connected to the memory and the rotational angle detector for increasing the output value of the torque detector at the end point $P_0$ at the rate of increase in torque, $T_0/\theta_2$, to provide an added value from the time when a rotation of a first rotational angle $\theta_1$ necessary for tightening the screw in the plastic region has completed after the end point $P_0$ of the second rotational angle $\theta_2$, a comparator connected to the adding means and the torque detector for comparing the added value of the adding means with the output value of the torque detector to provide a coincidence output when they coincide with each other, and a motor stop control circuit connected to the comparator and the nut runner for stopping a motor of the nut runner by the coincidence output of the comparator.

BRIEF DESCRIPTION OF THE DRAWINGS

The present invention will be described in detail below with reference to the accompanying drawings, in which.

DESCRIPTION OF THE PREFERRED EMBODIMENTS

To facilitate a better understanding of the present invention, a description will be given first, with reference to FIG. 1, of the elastic and plastic regions in screw tightening, which will be followed by a description given, with reference to FIG. 2, of detects of conventional plastic region tightening.

Figure 1:
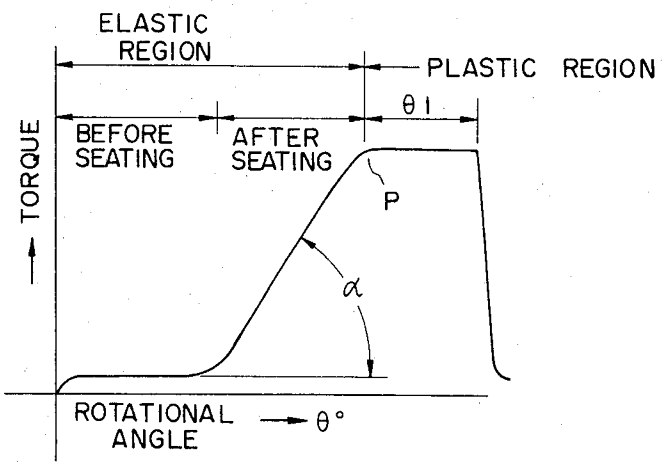
FIG. 1 is a characteristic curve showing a rotational angle-torque characteristic during tightening of a screw in the plastic region.

In case of tightening a screw having a head (nut), for example, a hexagon headed bolt, if the revolving speed of a tightening tool is constant, a torque after seating of the bearing surface of the screw rises linearly up to a point P at an inclination angle $\alpha$ and, thereafter the torque characteristic becomes flat as shown in FIG. 1. The point P is the critical point from the elastic region to the plastic region. The plastic region tightening is to further tighten the screw by a rotational angle $\theta_1$ in excess of the point P. An indispenable condition in the prior art for this tightening is to accurately detect the point P. For obtaining the point P there is no way but to determine it by differentiating the increasing value of the torque relative to the rotational angle and to decide a point at which the value becomes smaller than a fixed value. That is, letting a very small rotational angle be represented by a value $d\theta$ and the increasing value of the torque in the rotational angle be represented by a value dT, $dT/d\theta=\tan\alpha$ can be obtained. Further, after the point P, $dT/d\theta\cong 0$, so that the point P can be detected by the value of $dT/d\theta$ less than the constant value.

Figure 2:
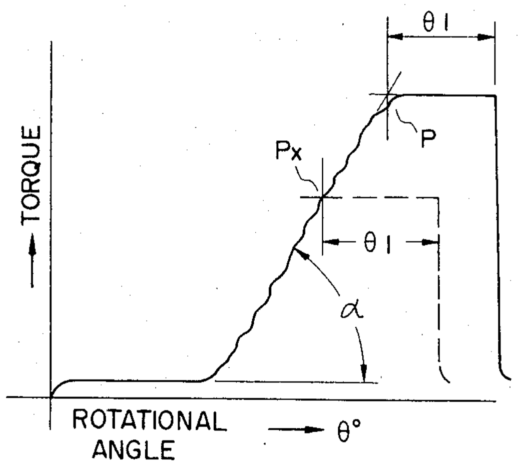
FIG. 2 is a characteristic curve showing a rotational angle-torque characteristic explanatory of an erroneous operation in the plastic region tightening of a screw.

In actual tightening, however, there are cases where the magnitude of torque increases while rising and falling over the entire period as shown in FIG. 2 and where it mostly undergoes a smooth variation but partly undulating. Accordingly, if a value of $dT/d\theta$ becomes approximately equal to zero at a certain intermediate point Px, and if additional tightening is carried out by a rotational angle $\theta_1$ regarding this point as the point P, then the tightening is such as indicated by the broken line in FIG. 2, resulting in the torque for this tightening being far smaller than the solid line torque at which actual tightening was originally intended to be taken place.

The present invention securely obviates such an erroneous operation as mentioned above and, in principle, it does not involve the detection of the critical point from the elastic region to the plastic region. A description will be given, with reference to FIG. 3, of the principle of the control circuit according to the present invention. The ratio $T_1/\theta_2$ of an increase $T_0$ of torque from the value $T_1$ to the value $T_2$ during tightening to the corresponding rotational angle $\theta_2$ (the rate of increase in the torque) and the torque $T_2$ are stored in a peak memory circuit described later. After rotation of the angle $\theta_1$ from the end point $p_0$ of the rotational angle $\theta_2$ the abovesaid stored values are read out so that the stored torque value $T_2$ is increased at the stored rate of increase $T_0/\theta_2$ and, at the intersection of the increased torque value to the actual tightening torque, the driving of the screw tightening tool is stopped. The result is the same as in the case of tightening of an angle $\theta_1$ from the point P; thus, accurate tightening can be effected without detecting the point P.

Figure 4:
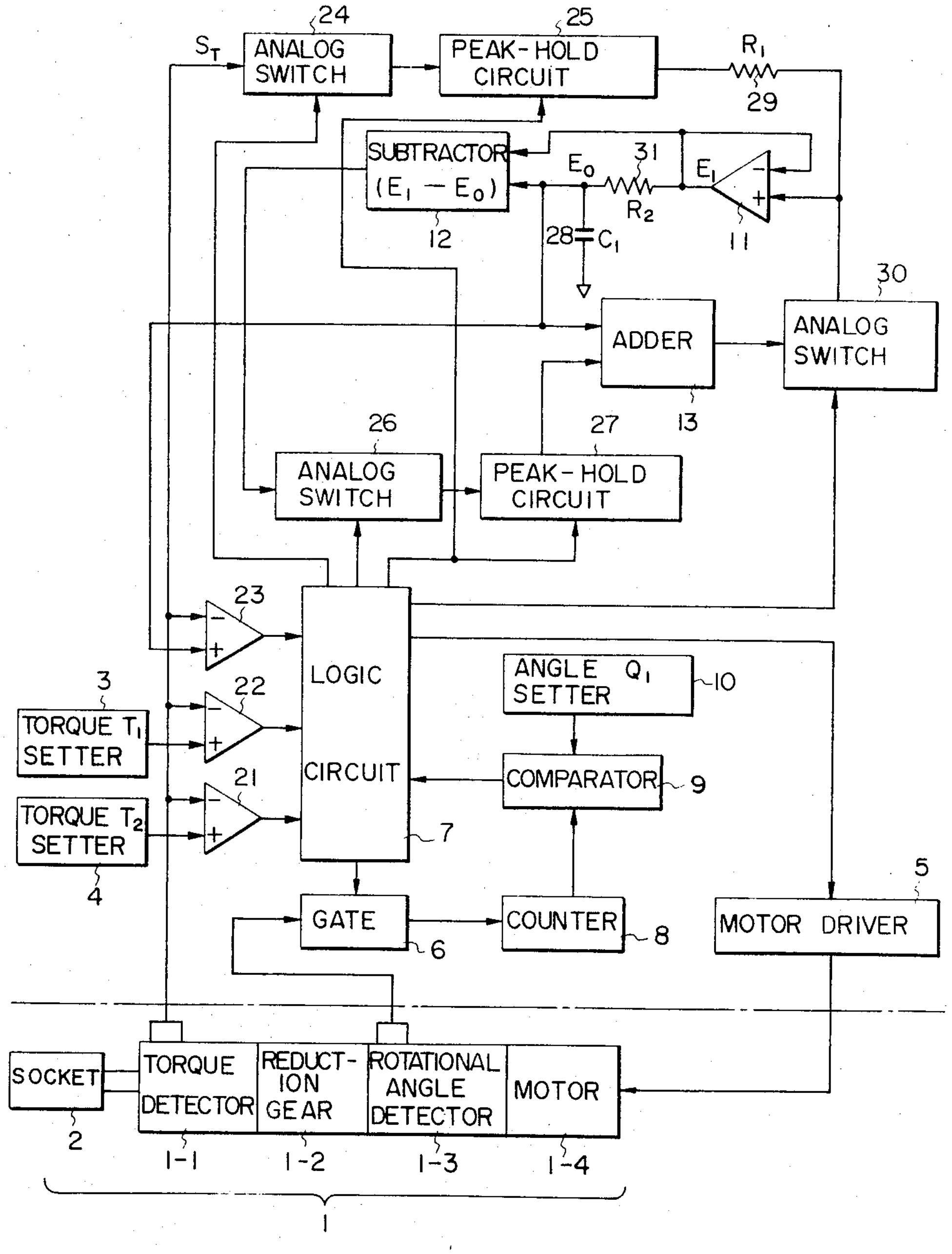
FIG. 4 is a block diagram illustrating an embodiment of the present invention.

FIG. 4 illustrates in block form an example of the arrangement of a plastic tightening control circuit for screw tightening according to the present invention.

With reference to FIG. 4, the present invention will be described in greater detail. In FIG. 4, reference numeral 1 at the bottom indicates a screw tightening tool (which is also referred to as a nut runner), in which are housed a motor 1-4 for driving at a constant speed a socket 2 receiving the screw head or a nut through a reduction gear 1-2, a torque detector 1-1 and a rotational angle detector 1-3 for detecting the rotational angle of the socket 2. The outputs from the torque detector 1-1 and the rotational angle detector 1-3 are applied to the tightening tool control circuit so that the motor 1-4 is controlled by a motor driver 5 to start, run and stop.

Figure 3:
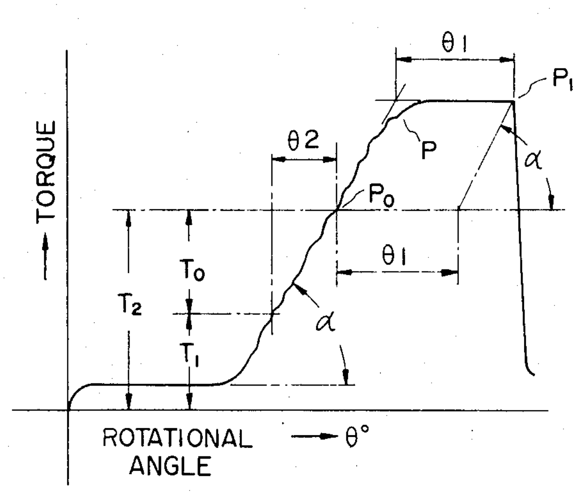
FIG. 3 is a characteristic curve a rotational angle-torque characteristic explanatory of the principle of the present invention.

Now, assuming that the tightening torque of the screw tightening tool 1 has reached a value $T_1$ in FIG. 3 in terms of the output of the torque detector 1-1, a comparator 22 produces an output while a logic circuit 7 turns ON an analog switch 24, through which a torque signal $S_T$ is applied to a peak hold (peak memory) circuit 25 to successively store therein the peak value of the torque. Reference numerals 21, 22 and 23 indicate comparators; 3 designates a setter for setting a first torque $T_1$ which is preset on the basis of experiments on the characteristic of FIG. 3; and 4 identifies a setter for a second torque $T_2$ which is similarly preset on the basis of experiments on the characteristic of FIG. 3. The torque peak value stored in the peak hold circuit 25 rises as the screw tightening is carried out and, at this time, an analog switch 30 assumes the OFF state, so that a voltage difference is provided between the output $E_1$ of a (DC) voltage follower 11 connected to the output of the peak hold circuit 25 and the output $E_0$ of a circuit composed of a resistor 29 and a capacitor 28. This difference is $E_1-E_0\cong\alpha$. The reason is as follows: The output $E_1$ is a voltage proportional to the current torque peak value, and the output $E_0$ is a voltage proportional to a previous torque peak value delayed by a delay time which is determined by the value $R_2$ of a resistor 31 and the value $C_1$ of the capacitor 28. If this difference is zero, then the torque is constant, so that this difference can be made to get closer to the inclination angle $\alpha$ by a suitable selection of the abovesaid value $R_2$ and $C_1$. The difference, $E_1-E_0$ is obtained by a subtractor 12, so that it is applied to a peak hold circuit 27 through an analog switch 26 which assumes the ON state at this time.

Next, when the tightening torque has further increased to reach the second torque $T_2$ in FIG. 3, the comparator 21 generates an output in response to the coincidence between the torque and the output of the torque $T_2$ setter 4. The output of the comparator 21 is applied to the logic circuit 7, from which signals are applied to the peak hold circuits 25 and 27 to store them therein and, at the same time, the logic circuit 7 sends out OFF signals to switch-OFF the analog switches 24 and 26. Further, since the logic circuit 7 opens a gate 6 at the same time, signals from the rotational angle detector 1-3 which starts at the time when the torque $T_2$ is reached are counted by a counter 8 and, when the counted contents of the counter 8 coincide with the value of an angle $\theta_1$ setter 10, a comparator 9 produces an output, which is applied to the logic circuit 7. Upon reception of this input, the logic circuit 7 turns ON the analog switch 31. However, since the resistor 29 is connected to the peak hold circuit 25, the output of an adder 13 is directly applied to the voltage follower 11. In this case, the adder 13, the analog switch 30, the voltage follower 11, the resistor 31 and the capacitor 28 set up a closed loop circuit. Incidentally, the one input to the adder 13 is the output $(E_1-E_0)$ of the peak hold circuit 27 at the time when the torque $T_2$ was reached, and the other input is the output $E_0$ of the circuit composed of the resistor 31 and the capacitor 28. The output $E_0$ of this time will hereinafter be identified by $E_0'$. In this case, however, the output $E_0'$ has risen up to a value substantially equal to the output $E_1$ at the time of the torque $T_2$ because of the elapse of a time duration from the time of the torque $T_2$ to the time of completion of counting the angle $\theta_1$. Accordingly, the output of the adder 13 becomes the sum, $E_1+E_1-E_0$, of $(E_1-E_0)$ and $E_1$, and this output is applied to the voltage follower 11 and, as a result of this, the output voltage $E_0$ gradually rises at the stored inclination angle $\alpha$. The coincidence between the voltage $E_0$ and the torque signal of the torque detector 1-1 indicates that the point $P_1$ in FIG. 3 is reached and, in this case, the comparator 23 applies its output to the logic circuit 7, which sends a stop signal to the motor driver 5 to quickly stop the motor 1-4, i.e. the tightening tool 1 from rotation. At this time, the analog switches 24, 30 and 26, the peak hold circuits 25 and 27 and the gate 6 are reset by the logic circuit 7.

As has been described in detail in the foregoing, in accordance with the present invention, the plastic region tightening of a screw can be accurately performed at a predetermined value of torque and by a preset rotational angle, permitting automatic unified accurate screw tightening. Accordingly, the present invention will greatly contribute to economization of the manhour and enhancement of quality.

What is claimed is:

1. A nut runner control circuit for controlling a nut runner comprising:
   - a torque detector of the nut runner for detecting a torque for tightening a screw;
   - a rotational angle detector coupled to the shaft of the nut runner for providing an output representative of the rotational angle of the nut runner;
   - memory means operatively connected to the torque detector and the rotational angle detector for temporarily storing a rate of increase in the torque in a second rotational angle during screw-tightening in an elastic region at the end of the second rotational angle and for storing the output value of the torque detector at the end of the second rotational angle;
   - adding means connected to the memory and the rotational angle detector for increasing the output value of the torque detector at the end of the second rotational angle at the rate of increase of torque to provide an added value from the time when a rotation of a first rotational angle neccessary for plastic region tightening has completed after the end of the second rotational angle;
   - a comparator connected to the adding means and the torque detector for comparing the added value of the adding means with the output value of the torque detector to provide a coincidence output when they coincide with each other;
   - motor stop control means connected to the comparator and the nut runner for stopping a motor of the nut runner by the coincidence output of the comparator.

2. A nut runner control circuit according to claim 1, in which said memory means includes a time constant circuit for delaying by a time constant the output of the torque detector, and a substractor for subtracting the output of the time constant circuit from the input of the time constant circuit to provide the rate of increase at the output of the subtractor.

3. A nut runner control circuit according to claim 2, in which said adding means adds the output of the time constant circuit and the rate of increase to provide the added value at the output of the time constant circuit.

* * * * *